United States Patent
Pratapa et al.

(10) Patent No.: US 9,584,467 B2
(45) Date of Patent: Feb. 28, 2017

(54) TECHNIQUE TO DELEGATE PREFIXES TO WI-FI CLIENTS CONNECTED TO MOBILE ACCESS POINT ROUTERS

(71) Applicant: QUALCOMM Incorporated, San Diego, CA (US)

(72) Inventors: Chaitanya Pratapa, Hyderabad (IN); Rohit Tripathi, San Diego, CA (US); Gaurav Gopal Kathuria, San Diego, CA (US); Tyler Byron Wear, San Diego, CA (US); Venu Madhav Mokkapati, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 317 days.

(21) Appl. No.: 14/558,875

(22) Filed: Dec. 3, 2014

(65) Prior Publication Data
US 2016/0036768 A1 Feb. 4, 2016

(30) Foreign Application Priority Data

Jul. 31, 2014 (IN) .......................... 3745/CHE/2014

(51) Int. Cl.
*H04L 29/12* (2006.01)
*H04W 76/02* (2009.01)
*H04W 84/12* (2009.01)

(52) U.S. Cl.
CPC ....... *H04L 61/2007* (2013.01); *H04L 61/2061* (2013.01); *H04L 61/305* (2013.01); *H04W 76/028* (2013.01); *H04L 61/6013* (2013.01); *H04L 61/6059* (2013.01); *H04W 84/12* (2013.01)

(58) Field of Classification Search
CPC ............. H04L 61/2007; H04L 61/2061; H04L 61/305; H04L 61/6059; H04L 61/6013; H04W 76/028; H04W 84/12
See application file for complete search history.

(56) References Cited

U.S. PATENT DOCUMENTS

| 8,493,910 | B2 | 7/2013 | Sarikaya et al. |
| 8,681,695 | B1 | 3/2014 | Krishnan |
| 2007/0133545 | A1 | 6/2007 | Tsuchino et al. |
| 2012/0314705 | A1 | 12/2012 | Howard |
| 2014/0215038 | A1 | 7/2014 | Donley et al. |

FOREIGN PATENT DOCUMENTS

WO 2009138034 A1 11/2009

OTHER PUBLICATIONS

International Search Report and Written Opinion—PCT/US2015/039744—ISA/EPO—Oct. 15, 2015.

*Primary Examiner* — Abdullahi E Salad
(74) *Attorney, Agent, or Firm* — The Marbury Law Group, PLLC (57) ABSTRACT

Methods, devices, systems, and non-transitory process-readable storage media of the various embodiments enable a software-enabled access point mobile computing device to delegate prefixes to already connected local area network (LAN) client devices upon establishment or re-establishment of a data connection. The various embodiments may enable a mobile computing device configured to operate as a mobile router (i.e., a softAP mobile computing device) to support prefix delegation by providing unique IPv6 prefixes to connected LAN client devices.

30 Claims, 7 Drawing Sheets

TECHNIQUE TO DELEGATE PREFIXES TO WI-FI CLIENTS CONNECTED TO MOBILE ACCESS POINT ROUTERS

RELATED APPLICATIONS

The present application claims priority to Indian Application No. 3745/CHE/2014, entitled "Technique to Delegate Prefixes To Wi-Fi Clients Connected To Mobile Access Routers," filed Jul. 31, 2014, the entire contents of which are hereby incorporated by reference.

BACKGROUND

Numerous techniques and protocols are utilized to enable computing devices to connect to and communicate over packet-switching, wide area networks (WANs). For example, Internet Protocol version 4 (IPv4) and Internet Protocol version 6 (IPv6) may be used to enable devices to exchange packet data over the Internet. For the IPv6 protocol, devices may connect to a WAN using 128-bit addresses that include unique prefixes that are typically 64-bit in length and that are administered by a network entity. In common scenarios, a router device (e.g., a Wi-Fi router, a software-enabled access point ("softAP") device, etc.) receiving such a prefix via its modem may share the same prefix with all client devices connected to a local area network (LAN) established by the router device such that all traffic to the WAN from the router device includes the same prefix. For example, LAN client devices connected to the router device may combine the shared prefix with a unique identifier (e.g., a MAC address, etc.) in order to generate their IPv6 address for packet transmissions. Such uniformity of prefix may be problematic for network carriers and other entities that desire to accurately identify different devices using the WAN and to bill based on usage. Further, although some duplicate address detection processes may be executed when LAN client devices generate their IPv6 address using a shared prefix, other LAN client devices may have the same address, causing redundancies in IPv6 addresses.

Some router devices (or packet data network (PDN) connections) may be configured to utilize a "prefix delegation" feature, such as described by the 3rd Generation Partnership Project (3GPP) (e.g., within the standards document 3GPP TS 23.060 V10.4.0). Implementing such a feature, a router device may obtain (via its modem) a single network prefix that is shorter than the default prefix size (e.g., 64-bit or /64). For example, the router device may obtain a short prefix 56-bit in size (or /56). The router device may allocate unique prefixes (e.g., 64-bit in length) used for IPv6 stateless auto-configuration using the bits that are not used in the short prefix (e.g., 56-bit in length, etc.), allowing a certain number of LAN client devices to all have unique prefixes. For example, when the default prefix is 64-bit long and the prefix delegation router device obtains a short prefix that is 56-bit long, the router device may utilize 8-bits to generate a fixed number of 64-bit unique prefixes based on the short prefix. Each of the generated 64-bit unique prefixes may then be assigned to different client devices connected to the router device (e.g., via a LAN connection). The router device may generate and assign 64-bit length unique prefixes upon request from connected LAN client devices. In this way, the remaining address space from the short prefix can be delegated to the router device (or PDN connection) using prefix delegation, so that the router device may provide on request a certain number of LAN client devices unique IPv6 addresses that fit into the total available IPv6 address space.

Prefix delegation is often utilized by some router devices. For example, a main use of prefix delegation is typically for a service provider to assign a prefix to a customer-provided equipment (CPE) device acting as a router between a subscriber's internal network and the service provider's core network. This may be useful for companies that need a large address space.

Router devices may not continually have an IPv6 data connection (i.e., a data call, a backhaul connection, a WWAN connection, a Wi-Fi connection, a USB connection, etc., to an access point or base station which provides connections to carrier networks and/or the Internet) established upon boot up. Some router devices, such as 4G and/or 3G based mobile routers (e.g., a Wi-Fi routers establishing 4G and/or 3G wireless connections to the PDN, softAP devices establishing 4G and/or 3G wireless connections to the PDN, etc.), may bring up a data connection on an as needed basis. For example, the router devices may establish LAN connections to the various LAN client devices upon boot up, but may only establish a data connection as requested, such as by a user selection enabling a data connection, an application requesting the establishment of a data connection, etc. Additionally, the data connection can be terminated and re-established due to factors inherent in wireless connections, including connection interruptions caused by the router device moving (e.g., being used in a car, on a train, while a user is walking, etc.), wireless interference, etc.

When a router device does not support prefix delegation, the lack of a continuous data connection may not present a problem because each time a data connection is established the router device will send unsolicited router advertisements to the pre-defined multicast "all nodes address." The use of the "all nodes address" will cause the router advertisement to be received by all connected LAN clients. In this manner the LAN clients will get a global IPv6 address each time the data connection is established/re-established.

When prefix delegation is utilized by a router device, each time a data connection is brought up (i.e., established or re-established), the network provides a delegated prefix, and all LAN clients (e.g., WLAN clients, USB tethered clients, etc.) connected to the router device will receive a unique prefix based on the delegated prefix. When using prefix delegation, each client is required to use the stateless address configuration procedure in order to receive its assigned unique prefix (i.e., each client must send the router device a solicitation message).

However, the need to have each client request its unique prefix with a solicitation message when using prefix delegation may pose a problem as LAN clients already connected to the router device when then data connection is brought up, may not send out solicitation messages. For example, the LAN client's stateless address configuration may have timed out and the LAN client may not send further router solicitation messages as described in Network Working Group Request for Comments 4861, section 6.3.7 "Sending Router Solicitations" available at http://www/rfc-base.org/txt/rfc-4861.txt. Because the already connected LAN clients may not send router solicitation messages, the connected LAN clients may not request and receive their unique prefixes. Without their unique prefixes, even though the data connection may be up (i.e., established or re-established), the already connected LAN clients may not access the Internet over IPv6 as the already connected LAN clients will not have a valid unique prefix.

SUMMARY

The methods, devices, systems, and non-transitory process-readable storage media of the various embodiments enable a software-enabled access point mobile computing device to delegate prefixes to already connected LAN client devices upon establishment or re-establishment of a data connection. The various embodiments may enable a mobile computing device configured to operate as a mobile router (i.e., a softAP mobile computing device) to support prefix delegation by providing unique IPv6 prefixes to connected LAN client devices. In an embodiment, a router configuration module of a softAP mobile computing device may determine whether an Internet Protocol version 6 (IPv6) data connection is established, generate a router solicitation message based on a link local address and client device identifier of the client device in response to determining that the IPv6 data connection is established, and send the generated router solicitation message to an IPv6 address management module of the softAP mobile computing device. The IPv6 address management module of the softAP mobile computing device may assign an unassigned prefix of a pool of available prefixes to the client device based on the received router solicitation message from the router configuration module.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile computing device" and "computing device" are used herein to refer to any one or all of cellular telephones, smart-phones, web-pads, tablet computers, Internet enabled cellular telephones, Wi-Fi enabled electronic devices, personal data assistants (PDA's), laptop computers, personal computers, and similar electronic devices equipped with at least a processor and configured with a network transceiver to establish a wide area network (WAN) and/or a local area network (LAN) connection (e.g., an LTE, 3G or 4G wireless wide area network transceiver, a wired connection to the Internet, or Wi-Fi).

The terms "software-enabled access point mobile computing device" or "softAP mobile computing device" or "mobile access point router" are used herein to refer to mobile computing devices configured to execute various software, applications, routines, instructions, and/or operations for operating as a routers capable of establishing WAN connections and LAN connections for enabling client devices to communicate with the WAN. For example, a softAP mobile computing device may be a smartphone configured to operate as a wireless router (e.g., mobile Wi-Fi router) for providing client devices access to a cellular wide area network.

The embodiment techniques described herein may utilize various wireless communication networks having such standards and/or protocols as Code division multiple access (CDMA), Time division multiple access (TDMA), Frequency Division Multiple Access (FDMA), Orthogonal Frequency-Division Multiple Access (OFDMA), etc. A CDMA network may implement a radio technology such as Universal Terrestrial Radio Access (UTRA), cdma2000, etc. UTRA includes Wideband-CDMA (W-CDMA) and other variants of CDMA. Further, cdma2000 may cover IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash Orthogonal Frequency Division Multiplexing (Flash-OFDM), etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2).

The various embodiments provide methods, devices, systems, and non-transitory process-readable storage media for a software-enabled access point mobile computing device to delegate prefixes to already connected LAN client devices upon establishment or re-establishment of a data connection. The various embodiments may enable a mobile computing device configured to operate as a mobile router (i.e., a softAP mobile computing device) to support prefix delegation by providing unique IPv6 prefixes to connected LAN client devices.

In an embodiment, a router configuration module of a mobile router may store client information, such as link local addresses (e.g., link local IPv6 addresses) and client device identifiers (e.g., MAC IDs) for client devices connecting to a LAN interface. For example, the router configuration module may store client information received in neighbor advertisement packets and/or NEW_NEIGH events generated as client devices establish LAN connections. In an embodiment, the router configuration module may monitor whether a data connection (i.e., a data call, a backhaul connection, a WWAN connection, a Wi-Fi connection, a USB connection, etc., to an access point or base station which provides connections to carrier networks and/or the Internet) is brought up (e.g., established or re-established). In an embodiment, each time a data connection is established the router configuration module may generate router solicitation messages (e.g., a router solicitation packet) based on the stored client information on behalf of all connected LAN clients, and may send the router solicitation messages to the IPv6 address management module. In this manner, the IPv6 address management module may be provided router solicitation messages as if each connected client device had generated its own router solicitation message. The IPv6 address management module may receive the router solicitation messages and assign unique IPv6 prefixes based on the router solicitation messages from the router configuration management module and send router advertisements including the unique IPv6 prefixes to each connected LAN client device's local link address. In this manner, each connected LAN client device may receive its unique IPv6 prefix and generate a unique IPv6 global address based on the unique IPv6 address with which to receive IPv6 data packets.

In an alternative embodiment, rather than generating a router solicitation message on behalf of the client device, each time a data connection is established a router configuration module may send an indication of the stored client information including at least the link local address and client device identifier to the IPv6 address management module to enable the IPv6 address management module to assign a unique IPv6 prefix.

In another alternative embodiment, rather than information being sent from the router configuration module to the IPv6 address management module to assign a unique IPv6 prefix, the LAN connection used by the LAN client device may be terminated each time a data connection is established, thereby causing the LAN client device to re-establish the LAN connection and send its own router solicitation message to the IPv6 address management module.

The various embodiments may provide methods for supporting prefix delegation by a softAP mobile computing device to a client device connected to a local area network (LAN) established by the softAP mobile computing device even though the client device's stateless address configuration processes may have timed out. In this manner, the various embodiments may improve the functioning of softAP mobile computing devices and/or client devices by enabling already connected client devices to make use of newly established or re-established IPv6 data connections. Additionally, the various embodiments may improve the functioning of softAP mobile computing devices and/or client devices by making connections by clients through the softAP mobile computing device more robust and providing automatic, repeatable, and more frequent data connection availability to connected clients devices through softAP mobile computing devices.

Figure 1:
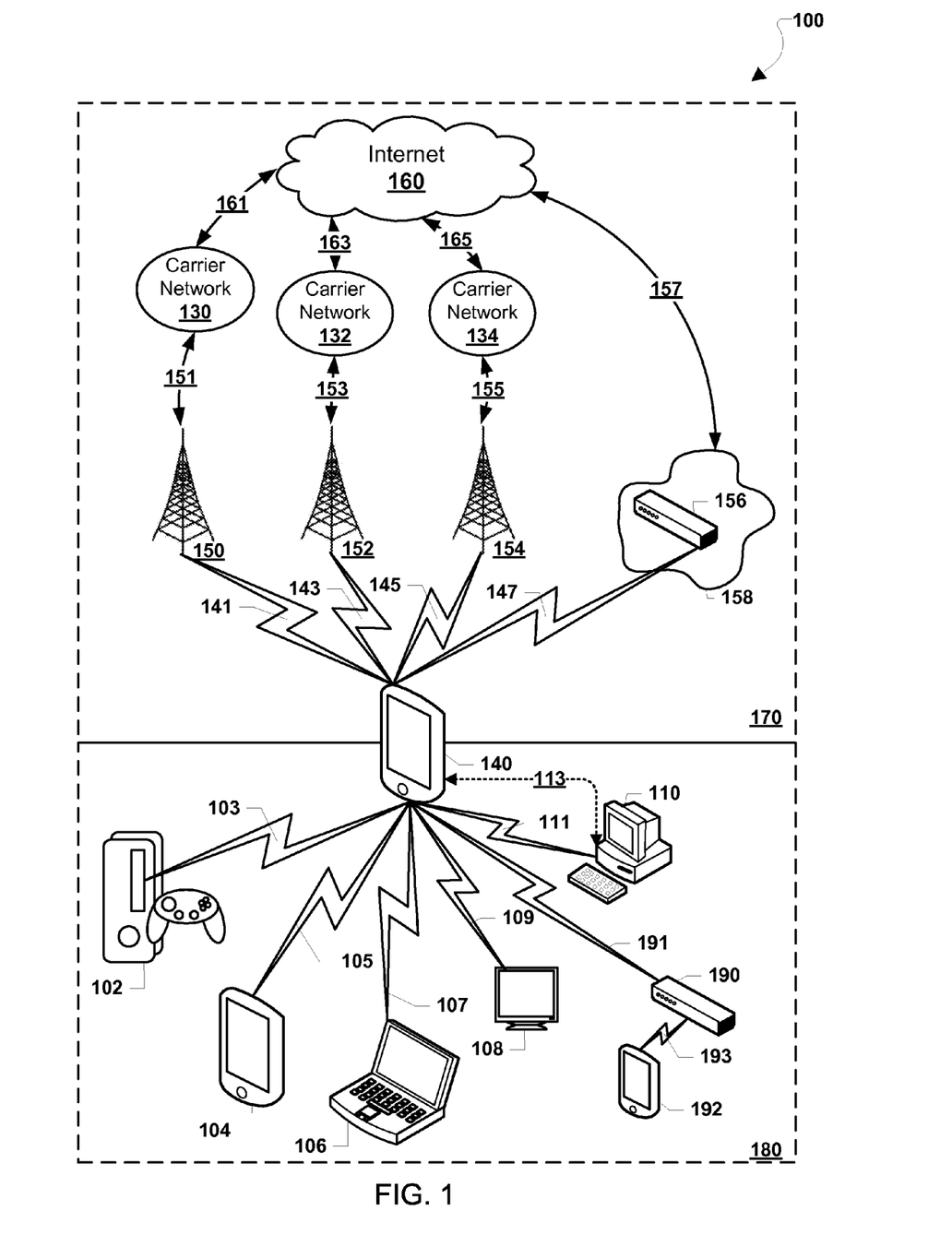
FIG. 1 is a component block diagram of a communication system including a mobile computing device functioning as a software-enabled access point (or mobile router) for various devices according to various embodiments.

FIG. 1 illustrates a communication system 100 including a software access point (softAP) mobile computing device 140 in wireless communication with various devices. The softAP mobile computing device 140 may be any mobile computing device capable of executing applications, routines, logic, instructions, circuitry, units, modules, and/or other components for enabling software-enabled access point (or mobile router) functionalities. For example, the softAP mobile computing device 140 may include Wi-Fi transceivers, cellular network chip(s)/modem(s), subscriber identity modules (SIMs or SIM cards), antenna, processor(s), memory(s), and other components that may enable the softAP mobile computing device 140 to establish a local area network (LAN) 180 (e.g., a Wi-Fi LAN) as well as communicate with various devices in a wide area network (WAN) 170. In particular, the softAP mobile computing device 140 may include components for communicating via wireless wide area network (WWAN) connections 141, 143, 145 with base stations 150, 152, 154 associated with various carrier networks 130, 132, 134 (e.g., cellular networks).

Each of the base stations 150, 152, 154 may be connected to their respective carrier networks 130, 132, 134 via connections 151, 153, 155. The carrier networks 130, 132, 134 may in turn have connections 161, 163, 165, respectively, to the Internet 160. Such base stations 150, 152, 154 and their respective carrier networks 130, 132, 134 may be affiliated with different telecommunication standards and/or protocols, such as Global System for Mobile Communications (GSM), 4$^{th}$ Generation (4G), 3$^{rd}$ Generation (3G), Universal Mobile Telecommunications System (UMTS), etc. For example, the first base station 150 and carrier network 130 may be associated with an long-term evolution (LTE) network, the second base station 152 and carrier network 132 may be associated with a wideband code division multiple access (WCDMA) network, and the third base station 154 and carrier network 134 may be associated with a code division multiple access (CDMA) network. In some embodiments, any combination of the base stations 150, 152, 154 and carrier networks 130, 132, 134 may utilize the same telecommunication standards (e.g., LTE, etc.).

In some embodiments, the softAP mobile computing device 140 may be configured to connect to another access point via wireless or wired communications. For example, the softAP mobile computing device 140 may connect via a wireless connection 147 to a hardware router 156 (or hardware Wi-Fi access point) associated with a local area network 158 having a connection 157 to the Internet 160. For example, the softAP mobile computing device 140 may utilize a Wi-Fi transceiver to exchange data with the hardware router 156. As another example, the softAP mobile computing device 140 may connect via a wired connection (e.g., a USB connection, etc.) to hardware router 156 having a connection 157 to the Internet 160. In other words, the softAP mobile computing device 140 may utilize a wireless (e.g., Wi-Fi) or wired (e.g., USB) backhaul via the hardware router 156 and/or other backhauls via the various base stations 150, 152, 154.

Executing software for enabling a connectable software access point (or software-enabled access point router), the softAP mobile computing device 140 may be capable of providing a local area network (LAN) 180 that may provide a plurality of client devices access to the various resources and/or devices via the WAN 170. In particular, the softAP mobile computing device 140 may serve as a LAN router (or hub) that provides a WAN connection for various client devices having wireless connection capabilities (e.g., Wi-Fi, etc.), such as a game console 102 (e.g., Xbox 360®, Xbox One®, etc.), a smartphone 104 (or tablet device), a laptop computer 106, a television device 108 (e.g., a smart TV), a desktop computer 110 (or personal computer), and a local router device 190.

Each of the client devices 102, 104, 106, 108, 110, 190 may be configured to connect to the softAP mobile computing device 140 via wired or wireless connections 103, 105, 107, 109, 111, 191. For example, the game console 102 may connect to the softAP mobile computing device 140 via a first connection 103, the smartphone 104 may connect to the softAP mobile computing device 140 via a second connection 105, the laptop computer 106 may connect to the softAP mobile computing device 140 via a third connection 107, the television device 108 may connect to the softAP mobile computing device 140 via a fourth connection 109, the desktop computer 110 may connect to the softAP mobile computing device 140 via a fifth connection 111, and the local router device 190 may connect to the softAP mobile computing device 140 via a sixth connection 191. As another example, the desktop computer 110 may connect to the softAP mobile computing device 140 via a universal serial bus (USB) connection 113 instead of or in addition to connecting to the softAP mobile computing device 140 via a Wi-Fi connection.

In various embodiments, the connections 103, 105, 107, 109, 111, 191 may be wired (e.g., USB connections, etc.) or wireless (e.g., Wi-Fi connections, etc.). In some embodiments, the connections 103, 105, 107, 109, 111, 191 may utilize various short-range or long-range wireless communication technologies, protocols, and/or standards, such as Bluetooth, Zigbee, Wi-Fi Direct, RF, etc.

In IPv6 prefix delegation operations, the softAP mobile computing device 140 may utilize a short prefix provided by a network resource (e.g., a 56-bit prefix, etc.) and the various client devices 102, 104, 106, 108, 110, 190 may utilize unique prefixes generated by the softAP mobile computing device 140 based on the short prefix. For example, each of the client devices 102, 104, 106, 108, 110, 190 may be assigned a 64-bit prefix in response to connected to the LAN 180 established by the softAP mobile computing device 140.

In some embodiments, the softAP mobile computing device 140 may indirectly provide a WAN connection to other devices. In particular, the local router device 190 connected to the WAN 170 via the LAN 180 established by the softAP mobile computing device 140 may in turn provide the WAN connection to another mobile computing device 192 via a Wi-Fi, Bluetooth, or other wired or wireless connection. In such a case, the other mobile computing device 192 may utilize any prefix designated to the local router device 190 by the softAP mobile computing device 140.

Figure 2A:
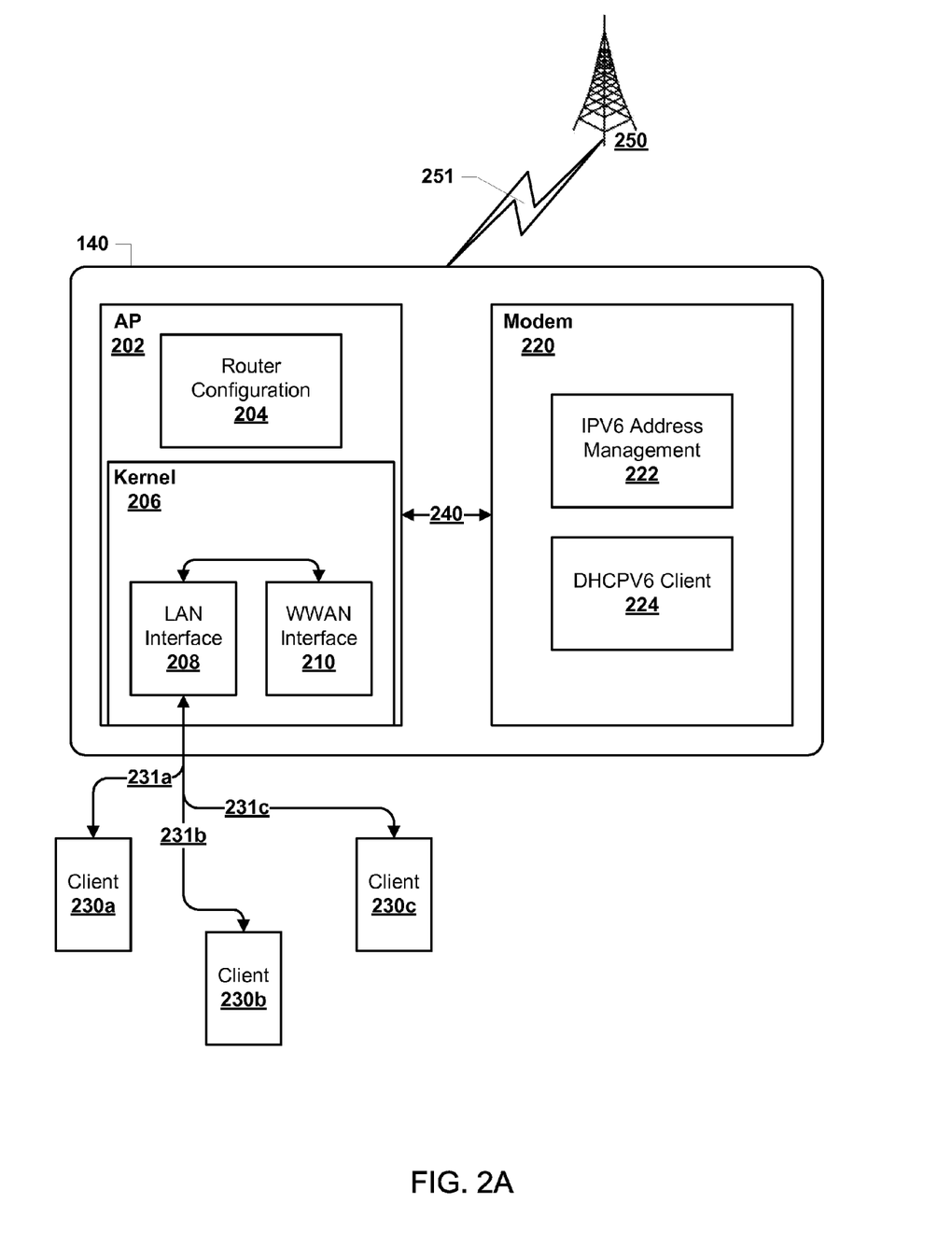
FIG. 2A is a component block diagram of modules within a mobile computing device configured to operate as a software-enabled access point (or mobile router) according to an embodiment.

FIG. 2A illustrates modules within a softAP mobile computing device 140 configured to operate as a mobile router suitable according to an embodiment. As described above, the softAP mobile computing device 140 may include various components and functionalities for conducting communications with resources in a wide area network (WAN). For example, the softAP mobile computing device 140 may include antennas/transceivers configured to exchange communications with a base station 250 of a cellular network via a wireless wide area network (WWAN) connection 251. The softAP mobile computing device 140 may include various components and functionalities for establishing a local area network (LAN) and conducting communications with resources connected to the LAN. For example, the softAP mobile computing device may include a Wi-Fi transceiver configured to exchange signals with nearby client devices 230a-230c via wireless connections 231a-231c (e.g., Wi-Fi communications, etc.).

The softAP mobile computing device 140 may include an application processor 202 configured to execute various software applications, modules, routines, instructions, and other operations. The application processor 202 may be configured to execute a router configuration module 204 (or mobile AP router configuration module or daemon) and a kernel module 206 (e.g., an operating system), such as Linux, Android, iOS, and/or Windows. In some embodiments, the router configuration module 204 may be configured to send router solicitation messages on behalf of connected LAN client devices to a IPv6 address configuration module 222 supported by the modem processor 220. The kernel module 206 may be configured to enable various functionalities of the softAP mobile computing device, such as operations for controlling a LAN interface module 208 for processing communications associated with a local area network (e.g., Wi-Fi communications with client devices 230a-230c, etc.), as well as a wireless wide area network (WWAN) interface module 210.

The softAP mobile computing device 140 may also include a modem including a modem processor 220 configured to execute and otherwise support various software modules for handling communications. In particular, the modem processor 220 may be configured to execute an IPv6 address management module 222 and a dynamic host configuration protocol (DHCP) v6 client device module 224 (or DHCPv6 client device module) for handling IP addresses. The DHCPV6 client device module 224 may be configured to obtain a short prefix (or a delegated prefix), such as a 56-bit (or /56) unique prefix, from a network resource in response to requests (or triggers) from the IPv6 address management module 222. The IPv6 address management module 222 may be configured to assign unique prefixes (e.g., 64-bit prefixes) to connected LAN client devices based on the short prefix received from the network resource. When the DHCPv6 client device module 224 obtains a short prefix from the network (e.g., a /56 prefix), the modem processor 220 may be capable of generating and assigning unique prefixes (e.g., 64-bit prefixes) for various connected LAN client devices, such as by generating linearly increasing 64-bit prefixes based on the short prefix. The modem processor 220 and the application processor 202 may be connected via a bus 240 for exchanging data and various signaling between the processing units.

The following is an illustration of an interaction between the various components of the softAP mobile computing device 140 for obtaining and managing unique prefixes for a LAN client devices 230a-230c according to some embodiments.

LAN client devices 230a-230c may establish wireless connections 231a-231c with the softAP mobile computing device 140 to establish a local area network. As the client devices 230a-230c connect to the LAN interface 208, the client devices 230a-230c may send router solicitation messages requesting their unique IPv6 prefixes (e.g., 64-bit) from the IPv6 address management module 222. The client devices 230a-230c may send router solicitation messages upon connecting to the LAN interface 208 for a set period of time and/or for a set number of attempts. When a data connection is established, the IPv6 address management module 222 may send the unique IPv6 prefix to the requesting client device 230a-230c in response to the received router solicitation message, and in response to receiving the IPv6 prefix the client device 230a-230c may cease sending further router solicitation messages. When a data connection is not established, the IPv6 address management module 222 may not send a unique IPv6 prefix, and in response to determining that the set period of time has expired and/or that the set number of attempts has been exceeded, the stateless address configuration efforts, specifically the sending of router solicitation messages, by the client device 230a-230c may time out and the client device 230a-230c may cease sending further router solicitation messages.

The modem processor 220 may be configured to directly setup a WAN connection (or PDN connection) with a wide area network (e.g., an LTE cellular network)(i.e., a data connection). The DHCPv6 client device module 224 may be configured to obtain a short prefix (e.g., a /56 prefix, etc.) from WAN resources via the WAN connection. Via the LAN interface module 208 and kernel module 206, the application processor 202 may receive a solicitation message from a LAN client device 230a, indicating that the LAN client device 230a is requesting a connection to an established LAN, and thus also utilize the WAN connection established by the softAP mobile computing device 140. The LAN interface module 208 may transfer the solicitation message indicating that the identifier of the LAN client device 230a through the WWAN interface module 210 to the modem processor 220 to be handled by the IPV6 address management module 222. When the WAN connection (i.e., the data connection) is established, in response to the received solicitation message, the IPV6 address management module 222 may assign a unique IPv6 prefix (e.g., 64-bit) to the LAN client device 230a that is based on the obtained short prefix (e.g., 56-bit). The unique IPv6 prefix may be transmitted to the LAN client device 230a. When the WAN connection (i.e., the data connection) is not established, no unique IPv6 prefix may be generated or sent.

In an embodiment, to enable a client device 230a-230c that may have timed out to receive a unique IPv6 prefix when the data connection is established and/or re-established after the client device 230a-230c has connected to the LAN interface 208, the router configuration module 204 may monitor a status of the data connection and send router solicitation messages on behalf of the connected client devices 230a-230c. As LAN connections to the client devices 230a-230c are brought up with the LAN interface 208, the router configuration module 204 may listen for advertisements and/or events, such neighbor advertisement packets from client devices and/or the kernel module 206, NEW_NEIGH events generated by the kernel module 206, etc., indicating the link local addresses (e.g., link local IPv6 address) and client device identifier (e.g., MAC address) used by the respective client devices 230a-230c connected to the LAN interface 208. The router configuration module 204 may store the link local addresses and client device identifier for the connected client devices 230a-230c. When a data connection is established and after the network assigns a delegated prefix, the router configuration module 204 may receive an indication that a data connection is established. For example, the indication may be a message from a module of the modem 220, such as the IPv6 address management module 222 or DHCPv6 client module 224, or may be a setting of a periodically checked flag in memory that indicates (e.g., by a 1 or a 0) that a data connection is established.

In an embodiment, in response to receiving the indication that the data connection is established, the router configuration module 204 may generate router solicitation messages (e.g., a router solicitation packet) on behalf of each connected client device 230a-230c. Each router solicitation message may be generated using the respective link local address and client device identifier of one of the client devices 230a-230c. In this manner, the router solicitation messages may appear to have been generated by the respective client devices 230a-230c themselves. The router configuration module 204 may send the generated router solicitation messages to the IPv6 management module 222. The IPv6 management module 222 may assign a unique IPv6 prefix from the pool of IPv6 prefixes to each client device 230a-230c associated with one of the router solicitation messages received from the router configuration module 204 as though the router solicitation messages were generated by the client devices 230a-230c. The IPv6 management module 222 may then send a router advertisement including that client device's 230a-230c respective unique IPv6 prefix to the link local address of the respective client device 230a-230c. In this manner, because the IPv6 management module 222 sends a router advertisement (e.g., a unicast router advertisement packet) only to the particular client device 230a-230c with the link local address identified in the router solicitation message generated by the router configuration module 204, only that particular client device 230a-230c may receive the router advertisement and use the unique IPv6 prefix to generate a unique global IPv6 address.

In an embodiment, rather than sending router solicitation messages to the IPv6 address management module 222 on behalf of the connected clients 230a-230c, in response to receiving the indication that the data connection is established, the router configuration module 204 may send an indication of the link local addresses (e.g., link local IPv6 address) and client device identifiers (e.g., MAC address) used by the respective client devices 230a-230c connected to the LAN interface 208 to the IPv6 address management module 222. The IPv6 address management module 222 may receive the link local addresses and client device identifiers, and use the client information (i.e., the link local addresses and/or client device identifiers) to assign a unique IPv6 prefix from the pool of IPv6 prefixes to each already connected client device 230a-230c. The IPv6 management module 222 may then send a router advertisement including that client device's 230a-230c respective unique IPv6 prefix to the link local address of the respective client device 230a-230c.

In a further embodiment, rather than sending router solicitation messages to the IPv6 address management module 222 on behalf of the connected clients 230a-230c or sending client device information to the IPv6 address management module 222, in response to receiving the indication that the data connection is established, the router configuration module 204 may forcibly disconnect the client devices 230a-230c from the LAN interface 208. In this manner, the client devices 230a-230c will attempt to reconnect to the LAN interface 208, and as part of reconnecting will reattempt stateless address configuration and send router solicitation messages to the IPv6 address management module 222. Because the data connection is established, the client devices 230a-230c may receive router solicitation messages with their assigned unique prefix.

While the application processor 202 and modem processor 220 are illustrated as separate processors in FIG. 2A, in another embodiment the modem processor 220 and application processor 202 may be the same processor, such as different cores of the same processor.

Figure 2B:
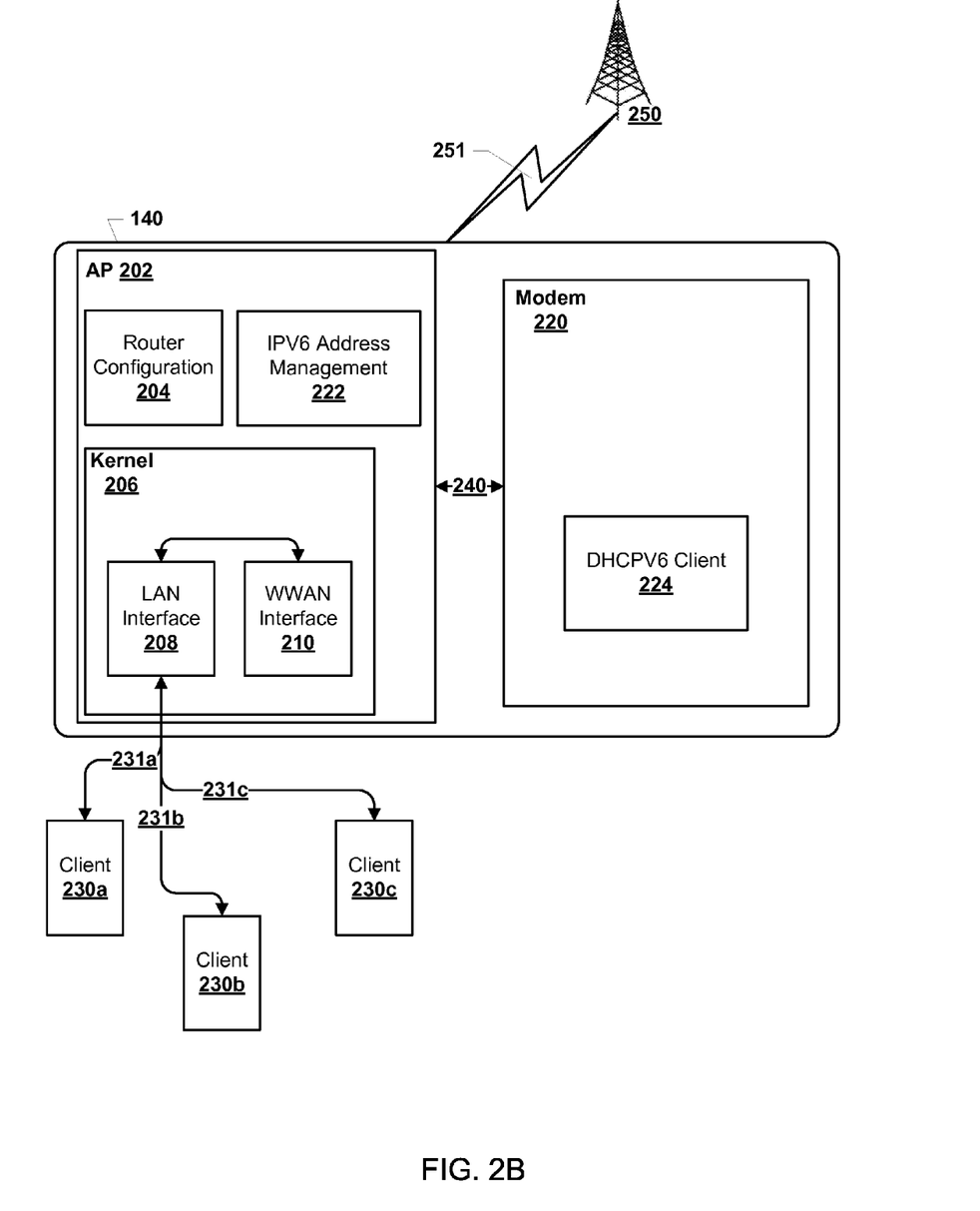
FIG. 2B is a component block diagram of modules within a mobile computing device configured to operate as a software-enabled access point (or mobile router) according to another embodiment.

FIG. 2B illustrates modules within a softAP mobile computing device 140 configured to operate as a mobile router according to another embodiment. The softAP mobile computing device 140 of the embodiment illustrated in FIG. 2B may operate in a manner similar to the softAP mobile computing device 140 described above with reference to FIG. 2A, except that in the softAP mobile computing device 140 of the embodiment illustrated in FIG. 2B, the IPv6 address management module 222 may be executed by the application processor 202.

Figure 3:
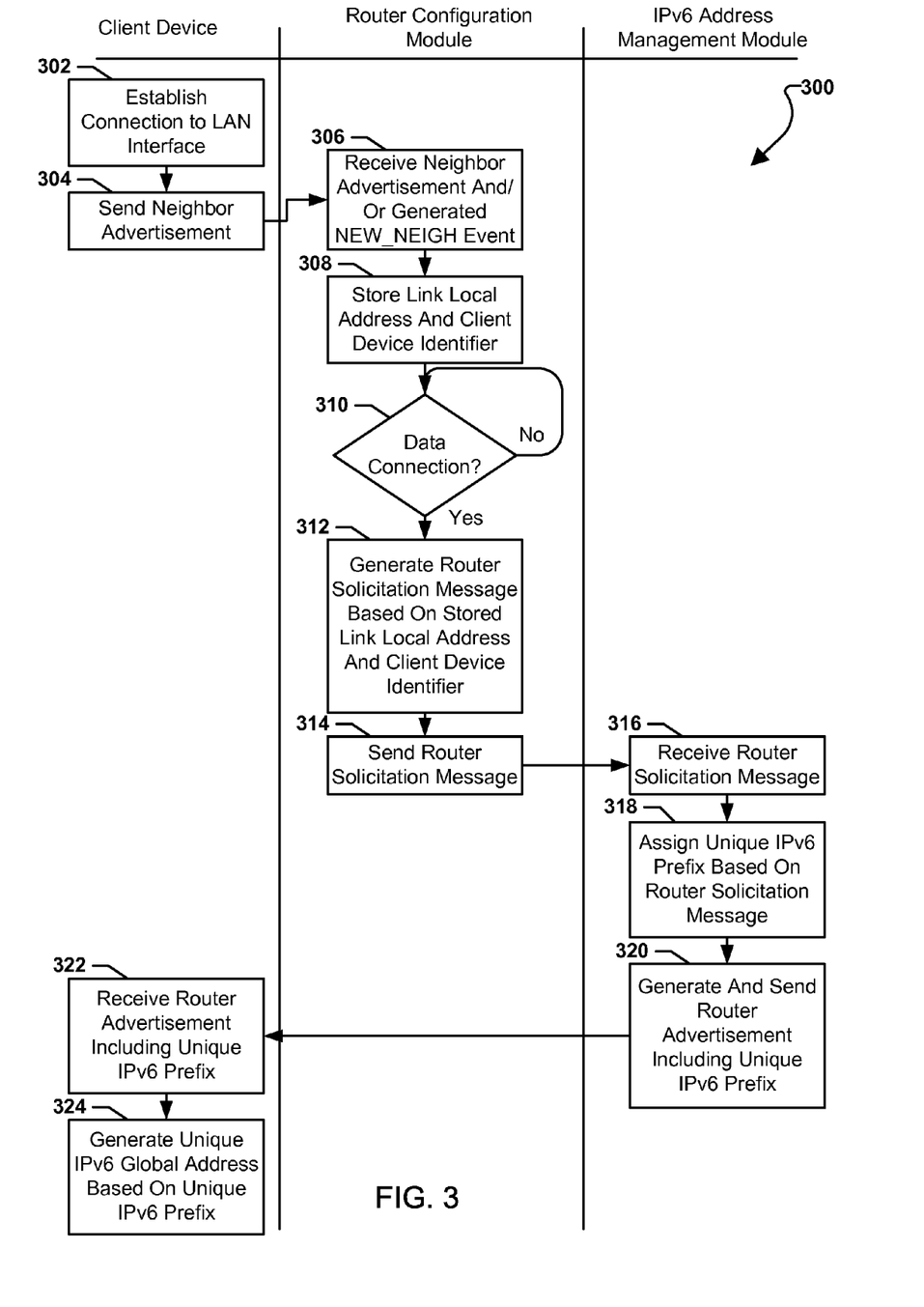
FIG. 3 is a process flow diagram illustrating an embodiment method for a mobile computing device configured to operate as a mobile router to support prefix delegation by providing unique IPv6 prefixes to connected LAN client devices.

FIG. 3 illustrates an embodiment method 300 for a mobile computing device configured to operate as a mobile router (i.e., a softAP mobile computing device) to support prefix delegation by providing unique IPv6 prefixes to connected LAN client devices. The operations of method 300 may be performed by various processors of the softAP mobile computing device, such as an application processor and/or a modem processor as described above, and processors of LAN client devices, such as the client devices described above.

In block 302 the LAN client device may establish a local area network (LAN) connection to the LAN interface of the softAP mobile computing device. The softAP mobile computing device may operate as a mobile router. As an example, the softAP mobile computing device may establish a Wi-Fi LAN and may broadcast a service set identifier (SSID) that may be used by client devices to connect to the LAN Interface of the of the softAP mobile computing device.

In block 304 the LAN client device may send a neighbor advertisement, such as a neighbor advertisement packet, to the kernel module including the router configuration module of the softAP mobile computing device. The neighbor advertisement, or one or more similar advertisements, may be an unsolicited advertisement sent by a client device as a client device connects to the LAN and may include information associated with the client device, such as the link local address (e.g., the link local IPv6 address) and client device identifiers (e.g., MAC address) used by the client device. Neighbor advertisements may be received by the kernel module and/or the router configuration module. In an embodiment, the kernel module may receive the neighbor advertisements and generate NEW_NEIGH events based on the neighbor advertisements which may be sent to the router configuration module. In block 306 the router configuration module of the softAP mobile computing device may receive the neighbor advertisement and/or the kernel module generated NEW_NEIGH event. In an embodiment, the NEW_NEIGH event may be one of the received messages or events (e.g., kernel events) that the softAP mobile computing device receives as LAN client devices connect to the LAN interface. The NEW_NEIGH event, or one or more similar events, may include the link local address (e.g., the link local IPv6 address) and client device identifiers (e.g., MAC address) used by the client device. In block 308 the router configuration module may store the link local address and client device identifiers in memory. For example, the router configuration module may write the link local address and client device identifiers into a routing table including client information, such as link local addresses, client device identifiers, and other information associated with client devices, associated with currently connected LAN client devices.

In determination block 310 the router configuration module may determine whether a data connection is established. An established data connection, such as an established IPv6 WAN connection, may be a connection between the softAP mobile computing device and a base station associated with a cellular network and/or a Wi-Fi router device connected to the Internet. Establishing a data connection may include the softAP mobile computing device obtaining a short prefix (e.g., a /56 prefix) from a network resource, with which the softAP mobile computing device may generate a finite number of unique prefixes (e.g., /64 prefixes) to assign to various LAN client devices. For example, for IPv6 WAN connections requiring 64-bit prefixes, in response to receiving a 56-bit short prefix (or subscriber prefix), the softAP mobile computing device may be capable of generating 64-bit LAN client device unique prefixes using the same 56-bit short prefix and adjustable 8 bits (i.e., 64 bits of maximum prefix allocation–56 bits of short prefix=8 bits that may change for making unique numbers to be combined with the 56 bits of the short prefix). Operations for establishing the IPv6 WAN connection may be performed by the softAP mobile computing device via a modem processor as described above. In an embodiment, when a data connection is established and after the network assigns a delegated prefix, the router configuration module may receive an indication that a data connection is established.

In an embodiment, the router configuration module may determine whether the data connection is established based on receiving an indication that the data connection is established. As examples, the indication that a data connection is established may be a message from a module of the modem, such as the IPv6 address management module or DHCPv6 client module, or may be a setting of a periodically checked flag in memory that indicates that a data connection is established.

In response to determining that a data connection is not established (i.e., determination block 310="No"), the router configuration module may continue to determine whether a data connection is established in determination block 310.

In response to determining that a data connection is established (i.e., determination block 310="Yes"), the router configuration module may generate a router solicitation message based on the stored link local address and client device identifier in block 312. As an example, the router configuration module may generate a router solicitation packet for each connected LAN client device based on that client device's stored link local IPv6 address and MAC address as though the router solicitation packet was generated by that respective LAN client device itself In block 314 the router configuration module may send the generated router solicitation message to the IPv6 address management module of the softAP mobile computing device and in block 316 the IPv6 address management module may receive the router solicitation message from the router configuration module. While the generated router solicitation message may be generated by and received from the router configuration module, the IPv6 address management module may identify and handle the router solicitation message as it had been generated and sent by the respective connected LAN client device.

In block 318 the IPv6 address management module may assign a unique IPv6 prefix based on the router solicitation message to the LAN client device. For example, the IPv6 address management module of the softAP mobile computing device may assign an unassigned prefix (e.g., a 64-bit prefix) of a pool of available prefixes to the identified LAN client device. Via a modem processor, the softAP mobile computing device may generate a unique 64-bit prefix for the LAN client device based on a short prefix (e.g., a 56-bit short prefix, etc.) previously obtained from network resources. The pool of available prefixes may be all prefixes the softAP mobile computing device is permitted to assign based on the short prefix (e.g., /56) assigned to the softAP mobile computing device by the network resource. Further, the pool of available prefixes may include assigned prefixes that are already assigned to client devices connected to the established LAN and unassigned prefixes associated with no client device. As described above, when configured to utilize a prefix delegation feature of IPv6 communications, the softAP mobile computing device may utilize or assign a finite number of prefixes based on the short prefix obtained from network resources (i.e., a short 56-bit prefix assigned to the softAP mobile computing device as a router). For example, when the short prefix obtained from network resources is 56 bits but the IPv6 prefix size is 64 bits, the softAP mobile computing device may use the difference of 8 bits to generate unique prefixes for LAN client devices. Accordingly, the softAP mobile computing device may generate or identify a currently unused 64-bit prefix that is based on the short prefix (e.g., 56-bit). In some embodiments, the softAP mobile computing device may utilize a table or other data structure to manage current assignments for unique prefixes, such as a data table including all assigned prefixes. As another example, such a data table may include entries for all possible prefixes capable of being assigned based on the short prefix, with each entry associated with a bit or flag indicating whether it is currently assigned to a LAN client device.

In block 320 the IPv6 address management module may generate and send a router advertisement including the unique IPv6 prefix to the connected LAN client device, and in block 322 the connected LAN client device may receive the router advertisement including the unique IPv6 prefix. For example, the router advertisement may be a router advertisement packet. In block 324 the connected LAN client device may generate a unique IPv6 global address based on the unique IPv6 prefix. The LAN client device may then use the unique IPv6 global address to receive IPv6 data packets.

Figure 4:
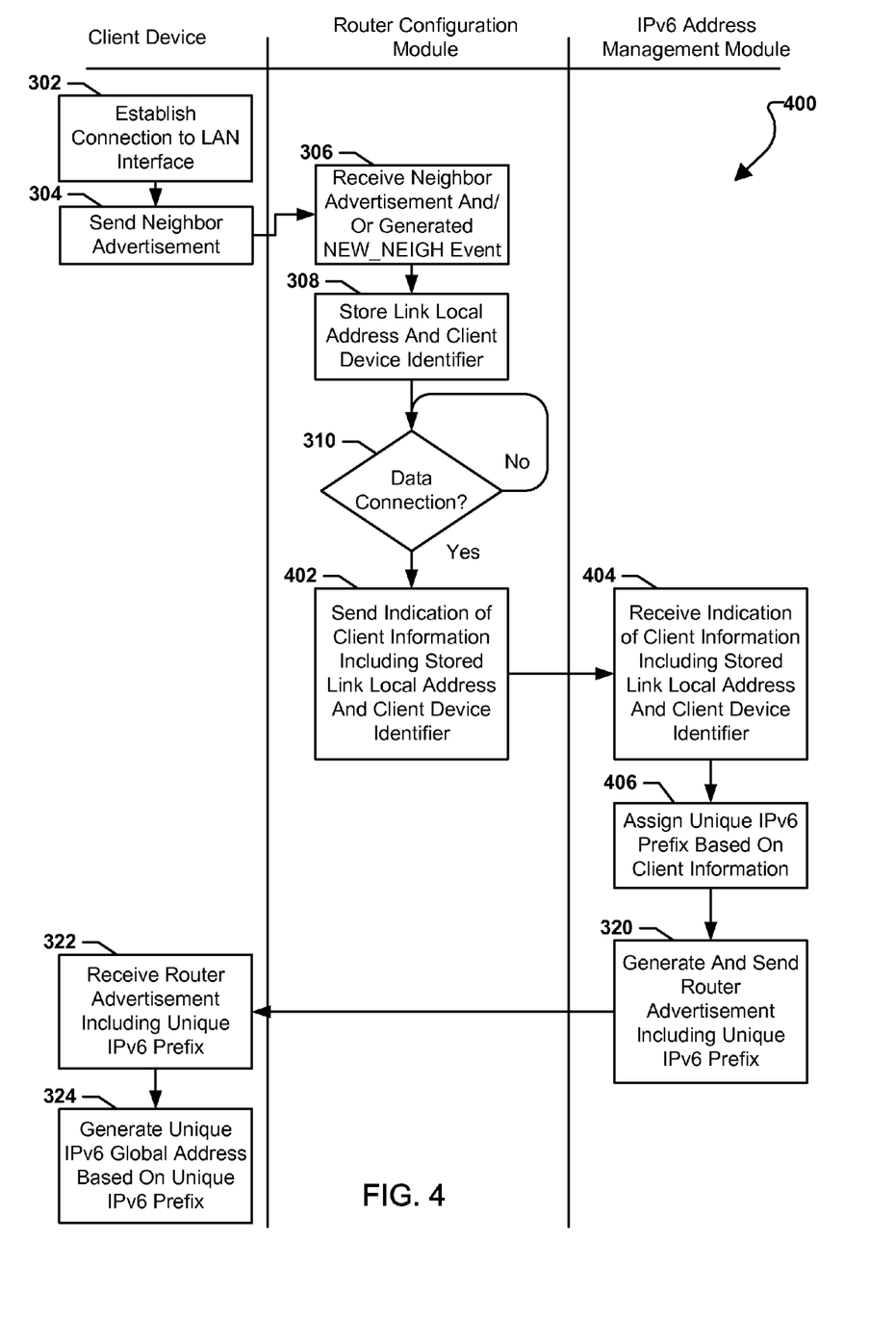
FIG. 4 is a process flow diagram illustrating another embodiment method for a mobile computing device configured to operate as a mobile router (i.e., a softAP mobile computing device) to support prefix delegation by providing unique IPv6 prefixes to connected LAN client devices.

FIG. 4 illustrates another embodiment method 400 for a mobile computing device configured to operate as a mobile router (i.e., a softAP mobile computing device) to support prefix delegation by providing unique IPv6 prefixes to connected LAN client devices. The method 400 is similar to the method 300 described above, except that the operations in method 400 may not include generating a router solicitation message on behalf of the client device. Rather, an indication of the stored client information including at least the link local address and client device identifier may be sent from the router configuration module to the IPv6 address management module.

In blocks 302-310 the client device and router configuration module of the softAP mobile computing device may perform operations of like numbered blocks of method 300 described above with reference to FIG. 3. In response to determining a data connection is established (i.e., determination block 310="Yes"), in block 402 the router configuration module may send an indication of the stored client information including the link local address and client device identifier may be sent from the router configuration module to the IPv6 address management module, In block 404 the IPv6 address management module of the softAP mobile computing device may receive the client information including at least the link local address and client device identifier. In this manner, rather than generating a router solicitation message, the router configuration module may merely provide the raw information needed to generate a unique IPv6 prefix to the IPv6 address management module.

In block 406 the IPv6 address management module may assign a unique IPv6 prefix based on the received client information. For example, the IPv6 address management module may assign the unique IPv6 prefix in a manner similar to the operations in block 318 described above with reference to FIG. 3 using the received link local address (e.g., a link local IPv6 address) and client information (e.g., a MAC ID) provided by the router configuration module without requiring a router solicitation message to be received. In blocks 320-324 the IPv6 address management module of the softAP mobile computing device and the client device may perform operations of like numbered blocks of method 300 described above with reference to FIG. 3.

Figure 5:
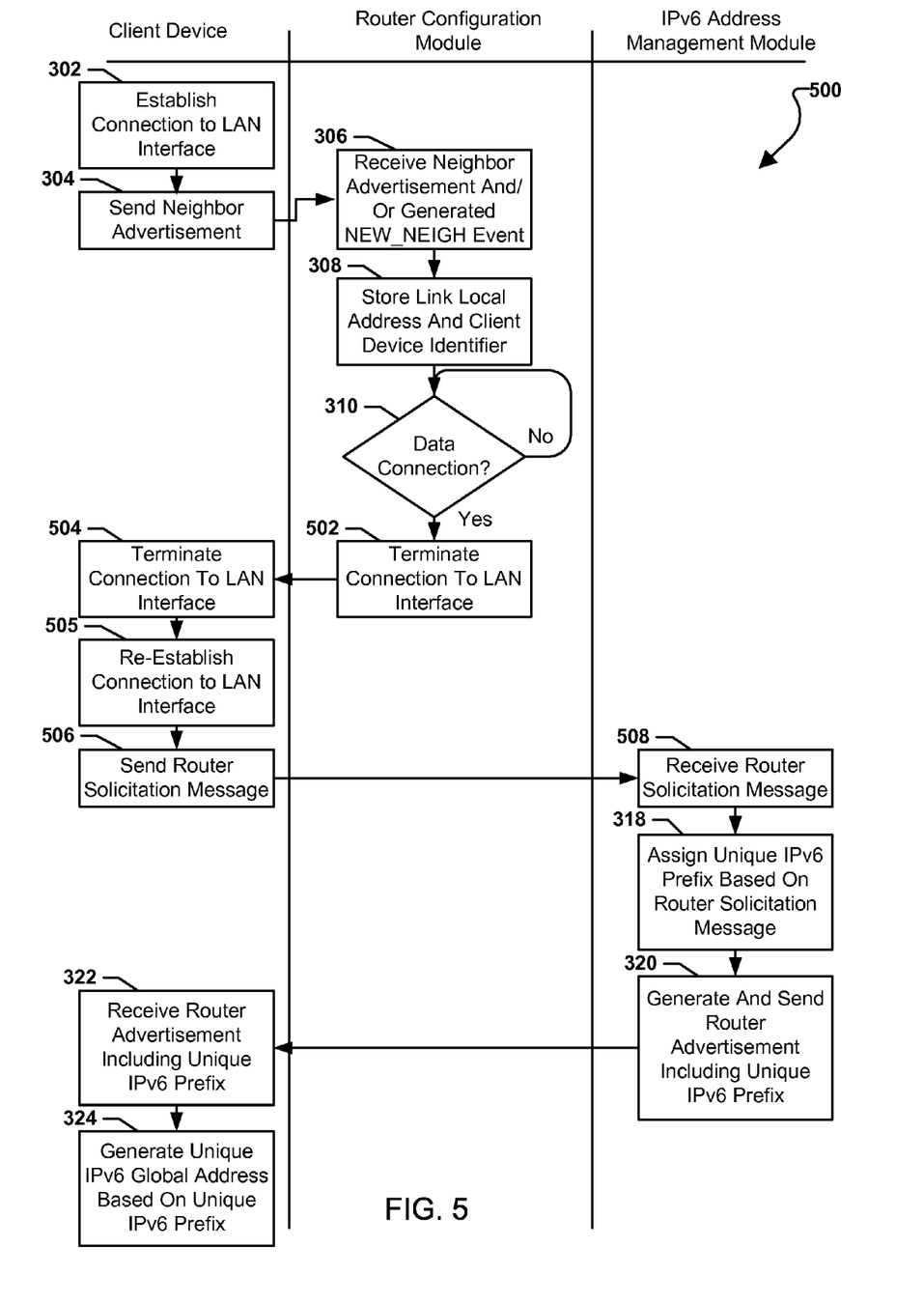
FIG. 5 is a process flow diagram illustrating a third embodiment method for a mobile computing device configured to operate as a mobile router (i.e., a softAP mobile computing device) to support prefix delegation by providing unique IPv6 prefixes to connected LAN client devices.

FIG. 5 illustrates another embodiment method 500 for a mobile computing device configured to operate as a mobile router (i.e., a softAP mobile computing device) to support prefix delegation by providing unique IPv6 prefixes to connected LAN client devices. The method 500 is similar to the method 300 described above, except that the operations in method 500 may not include client device information being sent from the router configuration module to IPv6 address management module to assign a unique IPv6 prefix. Rather, the LAN connection used by the LAN client device may be terminated each time a data connection is established, thereby causing the LAN client device to re-establish the LAN connection and send its own router solicitation message to the IPv6 address management module of the softAP mobile computing device.

In blocks 302-310 the client device and router configuration module of the softAP mobile computing device may perform operations of like numbered blocks of method 300 described above with reference to FIG. 3. In response to determining a data connection is established (i.e., determination block 310="Yes"), in block 502 the router configuration module may terminate the connections to the LAN interface for all connected LAN client devices and in block 504 the connection of the client device may be terminated.

In block 505 the client device may re-establish its connection to the LAN interface in a manner similar to that described above with reference to block 302. In this manner, the client device may, in effect, establish a new LAN connection to the softAP mobile computing device and LAN interface. Because the LAN client device is re-establishing its connection to the LAN interface, its stateless address configuration processes may be restarted and in block 506 the client device may send a router solicitation message to the IPv6 address management module of the softAP mobile computing device. In block 508 the IPv6 address management module may receive the router solicitation message from the LAN client device. In blocks 318-324 the IPv6 address management module of the softAP mobile computing device and the client device may perform operations of like numbered blocks of method 300 described above with reference to FIG. 3.

Figure 6:
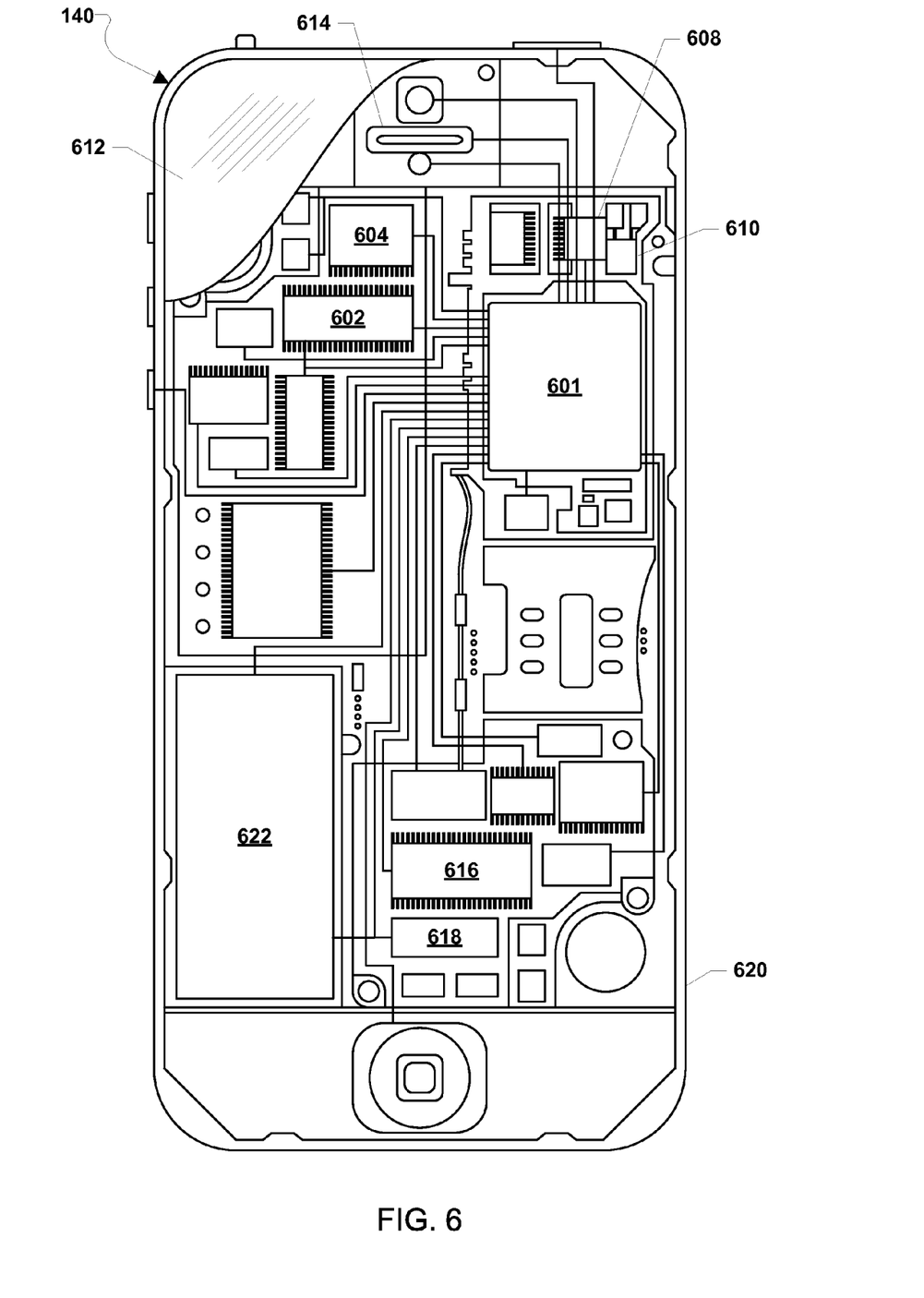
FIG. 6 is a component block diagram of a mobile computing device suitable for use in various embodiments.

Various embodiments (including, but not limited to, embodiments discussed above with reference to FIGS. 2A, 2B, and 3-5) may be implemented in any of a variety of computing devices. For example, FIG. 6 illustrates a mobile computing device 140 suitable for use in various embodiments. In various embodiments, the mobile computing device 140 may include a processor 601 coupled to a touch screen controller 604 and an internal memory 602. The processor 601 may be one or more multicore integrated circuits (ICs) designated for general or specific processing tasks. The internal memory 602 may be volatile or nonvolatile memory, and may also be secure and/or encrypted memory, or unsecure and/or unencrypted memory, or any combination thereof. The touch screen controller 604 and the processor 601 may also be coupled to a touch screen panel 612, such as a resistive-sensing touch screen, capacitive-sensing touch screen, infrared sensing touch screen, etc. The mobile computing device 140 may have one or more radio signal transceivers 608 (e.g., Peanut®, Bluetooth®, Zigbee®, Wi-Fi, RF, cellular, etc.) and antennae 610, for sending and receiving, coupled to each other and/or to the processor 601. The transceivers 608 and antennae 610 may be used with the above-mentioned circuitry to implement the various wireless transmission protocol stacks and interfaces. The mobile computing device 140 may include a cellular network wireless modem chip 616 that enables communication via a cellular network and is coupled to the processor. The mobile computing device 140 may include a peripheral device connection interface 618 coupled to the processor 601. The peripheral device connection interface 518 may be singularly configured to accept one type of connection, or multiply configured to accept various types of physical and communication connections, common or proprietary, such as USB, FireWire, Thunderbolt, or PCIe. The peripheral device connection interface 618 may also be coupled to a similarly configured peripheral device connection port (not shown). The mobile computing device 140 may also include speakers 614 for providing audio outputs. The mobile computing device 140 may also include a housing 620, constructed of a plastic, metal, or a combination of materials, for containing all or some of the components discussed herein. The mobile computing device 140 may include a power source 622 coupled to the processor 601, such as a disposable or rechargeable battery. The rechargeable battery may also be coupled to the peripheral device connection port to receive a charging current from a source external to the mobile computing device 140.

Processors of computing devices suitable for use in various embodiments may be any programmable microprocessor, microcomputer or multiple processor chip or chips that can be configured by software instructions (applications) to perform a variety of functions, including the functions of the various embodiments described above. In the various devices, multiple processors may be provided, such as one processor dedicated to wireless communication functions and one processor dedicated to running other applications. Typically, software applications may be stored in internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The steps of a method or algorithm disclosed herein may be embodied in a processor-executable software module or processor-executable instructions (or software instructions) that may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for supporting prefix delegation by a software-enabled access point ("softAP") mobile computing device to a client device connected to a local area network (LAN) established by the softAP mobile computing device, comprising:
   determining, by a router configuration module of the softAP mobile computing device, whether an Internet Protocol version 6 (IPv6) data connection is established;
   generating, by the router configuration module of the softAP mobile computing device, a router solicitation message based on a link local address and client device identifier of the client device in response to determining that the IPv6 data connection is established;
   sending the generated router solicitation message from the router configuration module of the softAP mobile computing device to an IPv6 address management module of the softAP mobile computing device; and
   assigning, by the IPv6 address management module of the softAP mobile computing device, an unassigned prefix of a pool of available prefixes to the client device based on the received router solicitation message.

2. The method of claim 1, further comprising establishing the IPv6 data connection by the softAP mobile computing device, wherein:
   the softAP mobile computing device receives a short prefix from a network resource; and
   the pool of available prefixes is based on the short prefix.

3. The method of claim 2, further comprising routing, by the softAP mobile computing device, traffic between the data connection and the client device using the assigned prefix.

4. The method of claim 3, wherein the short prefix is 56 bits long, and each in the pool of available prefixes is 64 bits long.

5. The method of claim 1, further comprising:
   receiving a NEW_NEIGH event or neighbor advertisement including the link local address and the client device identifier at the router configuration module of the softAP mobile computing device; and
   storing the link local address and the client device identifier in memory of the softAP mobile computing device.

6. The method of claim 1, wherein the router solicitation message is a router solicitation packet.

7. The method of claim 1, further comprising sending a router advertisement from the IPv6 address management module of the softAP mobile computing device to the client device including the assigned prefix, wherein the client device generates a unique IPv6 global address based on the assigned prefix in response to receiving the router advertisement.

8. The method of claim 7, wherein the router advertisement is a router advertisement packet.

9. The method of claim 1, wherein the link local address is a link local IPv6 address and the client device identifier is a MAC ID.

10. A method for supporting prefix delegation by a software-enabled access point ("softAP") mobile computing device to a client device connected to a local area network (LAN) established by the softAP mobile computing device, comprising:
    determining, by a router configuration module of the softAP mobile computing device, whether an Internet Protocol version 6 (IPv6) data connection is established;
    sending a link local address and client device identifier from the router configuration module of the softAP mobile computing device to an IPv6 address management module of the softAP mobile computing device in response to determining that the IPv6 data connection is established; and
    assigning, by the IPv6 address management module of the softAP mobile computing device, an unassigned prefix of a pool of available prefixes to the client device based on the received link local address and client device identifier.

11. The method of claim 10, further comprising establishing the IPv6 data connection by the softAP mobile computing device, wherein:
    the softAP mobile computing device receives a short prefix from a network resource; and
    the pool of available prefixes is based on the short prefix.

12. The method of claim 11, further comprising routing, by the softAP mobile computing device, traffic between the data connection and the client device using the assigned prefix.

13. The method of claim 12, wherein the short prefix is 56 bits long, and each in the pool of available prefixes is 64 bits long.

14. The method of claim 10, further comprising:
    receiving a NEW_NEIGH event or neighbor advertisement including the link local address and the client device identifier at the router configuration module of the softAP mobile computing device; and
    storing the link local address and the client device identifier in memory of the softAP mobile computing device.

15. The method of claim 10, wherein the router solicitation message is a router solicitation packet.

16. The method of claim 10, further comprising:
    sending a router advertisement from the IPv6 address management module of the softAP mobile computing device to the client device including the assigned prefix, wherein the client device generates a unique IPv6 global address based on the assigned prefix in response to receiving the router advertisement.

17. The method of claim 16, wherein the router advertisement is a router advertisement packet.

18. The method of claim 10, wherein the link local address is a link local IPv6 address and the client device identifier is a MAC ID.

19. A method for supporting prefix delegation by a software-enabled access point ("softAP") mobile computing device to a client device connected to a local area network (LAN) established by the softAP mobile computing device, comprising:

determining, by a router configuration module of the softAP mobile computing device, whether an Internet Protocol version 6 (IPv6) data connection is established; and     terminating, by the router configuration module of the softAP mobile computing device, all connections of the LAN in response to determining that the IPv6 data connection is established,     wherein the client device is configured to establish a new LAN connection to the softAP mobile computing device in response to the LAN connection being terminated, generate a router solicitation message based on a link local address and client device identifier of the client device in response to establishing the new LAN connection, and send the generated router solicitation message from the client device to an IPv6 address management module of the softAP mobile computing device configured to assign an unassigned prefix of a pool of available prefixes to the client device based on the received router solicitation message.

20. The method of claim 19, further comprising establishing the IPv6 data connection by the softAP mobile computing device, wherein:

the softAP mobile computing device receives a short prefix from a network resource; and     the pool of available prefixes is based on the short prefix.

21. The method of claim 20, further comprising routing, by the softAP mobile computing device, traffic between the data connection and the client device using the assigned prefix.

22. The method of claim 21, wherein the short prefix is 56 bits long, and each in the pool of available prefixes is 64 bits long.

23. The method of claim 19, further comprising:

receiving a NEW_NEIGH event or neighbor advertisement including the link local address and the client device identifier at the router configuration module of the softAP mobile computing device; and     storing the link local address and the client device identifier in memory of the softAP mobile computing device.

24. The method of claim 19, wherein the router solicitation message is a router solicitation packet.

25. The method of claim 19, further comprising:

sending a router advertisement from the IPv6 address management module of the softAP mobile computing device to the client device including the assigned prefix, wherein the client device generates a unique IPv6 global address based on the assigned prefix in response to receiving the router advertisement.

26. The method of claim 25, wherein the router advertisement is a router advertisement packet.

27. The method of claim 19, wherein the link local address is a link local IPv6 address and the client device identifier is a MAC ID.

28. A mobile computing device, comprising a processor configured with processor-executable instructions to perform operations comprising:

determining whether an Internet Protocol version 6 (IPv6) data connection is established;

generating a router solicitation message based on a link local address and client device identifier of a client device in response to determining that the IPv6 data connection is established;

sending the generated router solicitation message to an IPv6 address management module of the softAP mobile computing device;

assigning an unassigned prefix of a pool of available prefixes to the client device based on the received router solicitation message; and     sending the IPv6 prefix to the client device.

29. The mobile computing device of claim 28, wherein the processor is configured with processor-executable instructions to perform operations further comprising establishing the IPv6 data, wherein:

the processor receives a short prefix from a network resource;

the pool of available prefixes is based on the short prefix; and routing traffic between the data connection and the client device using the assigned prefix.

30. The mobile computing device of claim 28, wherein the processor is configured with processor-executable instructions to perform operations further comprising:

receiving a NEW_NEIGH event or neighbor advertisement including the link local address and the client device identifier; and     storing the link local address and the client device identifier in memory.

\* \* \* \* \*